United States Patent
Takeda et al.

(10) Patent No.: US 12,092,897 B2
(45) Date of Patent: Sep. 17, 2024

(54) OPTICAL UNIT

(71) Applicant: NIDEC SANKYO CORPORATION, Nagano (JP)

(72) Inventors: Tadashi Takeda, Nagano (JP); Takeshi Sue, Nagano (JP); Shinji Minamisawa, Nagano (JP); Tsutomu Arai, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 552 days.

(21) Appl. No.: 17/348,764

(22) Filed: Jun. 16, 2021

(65) Prior Publication Data
US 2021/0396953 A1 Dec. 23, 2021

(30) Foreign Application Priority Data
Jun. 22, 2020 (JP) .................................. 2020-106981

(51) Int. Cl.
*G02B 7/182* (2021.01)

(52) U.S. Cl.
CPC .................................. *G02B 7/182* (2013.01)

(58) Field of Classification Search
CPC ...... G03B 21/00–64; G02B 26/00–129; G02B 27/00–648; G02B 7/182
See application file for complete search history.

(56) References Cited

U.S. PATENT DOCUMENTS

2019/0196308 A1* 6/2019 Chang .................... G02B 7/005

FOREIGN PATENT DOCUMENTS

CN 107357026 A 11/2017

* cited by examiner

*Primary Examiner* — Bao-Luan Q Le
*Assistant Examiner* — Christopher A Lamb, II
(74) *Attorney, Agent, or Firm* — HAUPTMAN HAM, LLP

(57) ABSTRACT

An optical unit includes: a reflection portion which reflects an incident light flux from an incident direction on the outside in a reflection direction toward an imaging element; a movable body including the reflection portion; a fixed body; a movable mechanism which allows the movable body to move relative to the fixed body; and a gimbal mechanism including a first support portion which supports the movable body swingably about a first axis, and including a second support portion which is swingably supported by the fixed body about a second axis intersecting the first axis direction.

14 Claims, 13 Drawing Sheets

OPTICAL UNIT

RELATED APPLICATIONS

The present application claims priority to Japanese Application Number 2020-106981, filed Jun. 22, 2020, the disclosure of which is hereby incorporated by reference herein in its entirety.

FIELD OF THE INVENTION

At least an embodiment of the present invention relates to an optical unit.

DESCRIPTION OF THE RELATED DOCUMENTS

Various optical units have conventionally been used. Among these optical units, an optical unit which allows a movable body, which is provided with a reflection portion that reflects an incident light flux from outside toward an imaging element, to move relative to a fixed body is used. For example, CN107357026A discloses an optical unit which supports a movable body provided with a prism as a reflection portion by means of a plate spring, and allows the prism to move relative to a fixed body.

In the optical unit configured to allow the movable body provided with the reflection portion to move relative to the fixed body as described above, preferably, the movable body provided with the reflection portion should be greatly displaced relative to the fixed body. This is because such a large displacement can effectively cancel out a camera shake in camera shake correction, for example. However, in the conventional optical unit configured to allow the movable body provided with the reflection portion to move relative to the fixed body, in some cases, it is difficult to greatly displace the movable body relative to the fixed body. For example, in the optical unit of CN107357026A, in the case where strength of the plate spring is reduced, the movable body can be greatly displaced relative to the fixed body. However, reduction of the strength of the plate spring causes the movable body to easily oscillate, and a drive frequency of the optical unit and a resonance frequency of the movable body may become approximated. For this reason, it is difficult to employ a plate spring of low strength. Also, as the configuration which allows the movable body provided with the reflection portion to move relative to the fixed body, a configuration in which a lens is shifted relative to the reflection portion and a configuration in which the reflection portion is swung by a single axis alone are known. However, with such configurations, it is difficult to greatly displace the movable body relative to the fixed body. Therefore, an object of at least an embodiment of the present invention is to provide an optical unit capable of greatly displacing a movable body provided with a reflection portion relative to a fixed body.

SUMMARY

An optical unit according to at least an aspect of the present invention includes: a reflection portion which reflects an incident light flux from an incident direction on outside in a reflection direction toward an imaging element; a movable body including the reflection portion; a fixed body; a movable mechanism which allows the movable body to move relative to the fixed body; and a gimbal mechanism including a first support portion which supports the movable body swingably about a first axis, and including a second support portion which is swingably supported by the fixed body about a second axis intersecting the first axis direction.

According to the present aspect, the optical unit includes the gimbal mechanism including: the first support portion which supports the movable body swingably about the first axis; and the second support portion which is swingably supported by the fixed body about the second axis. By providing such a two-axis gimbal mechanism, the movable body provided with the reflection portion can be greatly displaced relative to the fixed body.

The optical unit according to at least an aspect of the present invention can be configured that the gimbal mechanism is arranged such that the movable body can be swung with reference to a rolling axis along the reflection direction and that the movable body can be swung with reference to a pitching axis which intersects the rolling axis. By employing such a configuration, the movable body can be greatly displaced relative to the fixed body with the rolling axis and the pitching axis being swing axes.

The optical unit according to at least an aspect of the present invention can be configured that the gimbal mechanism includes a frame portion which is provided with the first support portion and the second support portion and that the frame portion is arranged to be located on a leading side in the incident direction relative to the movable body. By employing such a configuration, an effect of manufacturing tolerance of the gimbal mechanism can be easily reduced.

The optical unit according to at least an aspect of the present invention can be configured that the frame portion is provided with an aperture which prevents contact between the movable body and the frame portion when the movable body is swung. By employing such a configuration, the optical unit can be downsized while the contact between the movable body and the frame portion at the time when the movable body is swung is prevented.

The optical unit according to at least an aspect of the present invention can be configured that the gimbal mechanism includes a frame portion which is provided with the first support portion and the second support portion, and the frame portion is arranged to be located around the movable body when seen in the incident direction. By employing such a configuration, the optical unit can be formed thinly in the incident direction.

The optical unit according to at least an aspect of the present invention can be configured that the gimbal mechanism is arranged such that the movable body can be swung with reference to a pitching axis which intersects a rolling axis along the reflection direction and that the movable body can be swung with reference to a yawing axis which intersects the rolling axis and also intersects the pitching axis. By employing such a configuration, the movable body can be greatly displaced relative to the fixed body with the pitching axis and the yawing axis being the swing axes.

The optical unit according to at least an aspect of the present invention can be configured that the gimbal mechanism is arranged in a direction in which at least one of the pitching axis and the yawing axis is along a reflection surface of the reflection portion. By employing such a configuration, the optical unit can be formed thinly in a direction that intersects the reflection surface.

The optical unit according to at least an aspect of the present invention can be configured that the first axis and the second axis intersect in such arrangement that, when seen in the reflection direction, an intersection angle on the incident direction side is larger than an intersection angle on an intersection direction side intersecting the incident direction. By employing such a configuration, the optical unit can be formed thinly in the incident direction.

The optical unit according to at least an aspect of the present invention can be configured that the movable mechanism includes: a magnet provided on the movable body; and a coil provided at a position, which opposes the magnet, on the fixed body. By employing such a configuration, the movable mechanism can be formed easily, and it is possible to prevent a cable connected to the coil, for example, from obstructing mobility of the movable body.

The optical unit according to at least an aspect of the present invention can be configured that the movable mechanism includes, as the magnets: a first magnet provided on the incident direction side of the movable body; and a second magnet which is smaller than the first magnet and is provided on each of the intersection direction sides of the movable body. By employing such a configuration, it is possible to prevent performance of the movable mechanism from being lowered due to the optical unit being formed thinly in the incident direction.

The optical unit of at least an embodiment of the present invention can greatly displace the movable body provided with the reflection portion relative to the fixed body.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figure 1:
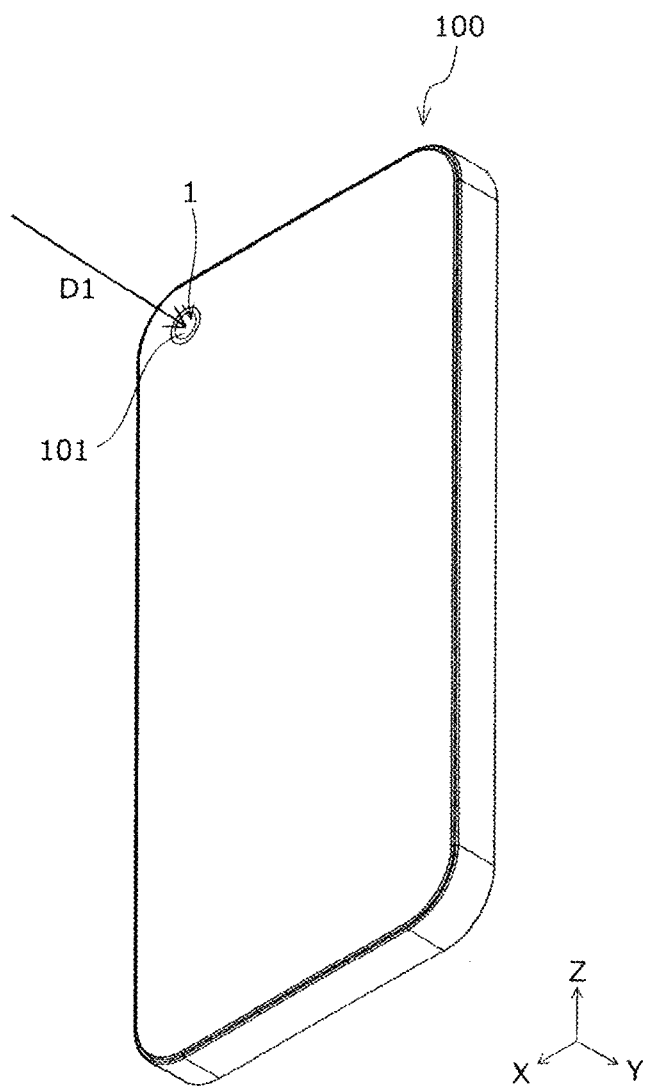
FIG. 1 is a perspective view of a smartphone provided with an optical unit according to a first embodiment of the present invention.

A description will hereinafter be made on an embodiment of the present invention with reference to the drawings. It is noted that the same reference numerals are given to the same components in each of the embodiments, these components will only be described in an embodiment where they first appear, and their description will be omitted in the following embodiments. In each of the drawings, an X-axis, a Y-axis and a Z-axis represent directions orthogonal to each other. A view as seen in +X direction and −X direction is referred to as a side view, a view as seen in +Y direction is referred to as a plan view, a view as seen in −Y direction is referred to as a bottom view, a view as seen in +Z direction is referred to as a back view, and a view as seen in −Z direction is referred to as a front view. Further, the +Y direction corresponds to an incident direction D1, which is a direction of incidence of a light flux from outside.

First Embodiment (FIGS. 1 to 4)

First, an optical unit 1 according to a first embodiment of the present invention will be described with reference to FIGS. 1 to 4.

Overview of Device Provided with Optical Unit

FIG. 1 is a schematic perspective view of a smartphone 100 as an example of a device provided with the optical unit 1 of the present embodiment. The optical unit 1 of the present embodiment can be preferably used in the smartphone 100. The optical unit 1 of the present embodiment can be configured to be thin, which is for making thickness of the smartphone 100 in the Y-axis direction small. However, the optical unit 1 of the present embodiment is not limitedly applied to the smartphone 100, and can be used in various devices that are not particularly limited, such as cameras and videos.

As illustrated in FIG. 1, the smartphone 100 is provided with a lens 101 on which a light flux is made incident. Inside the lens 101 of the smartphone 100, the optical unit 1 is provided. The smartphone 100 is configured to allow the light flux to be incident from the outside in the incident direction D1 via the lens 101, and to enable capturing of a subject image on the basis of the incident light flux.

Overall Configuration of Optical Unit

Figure 2:
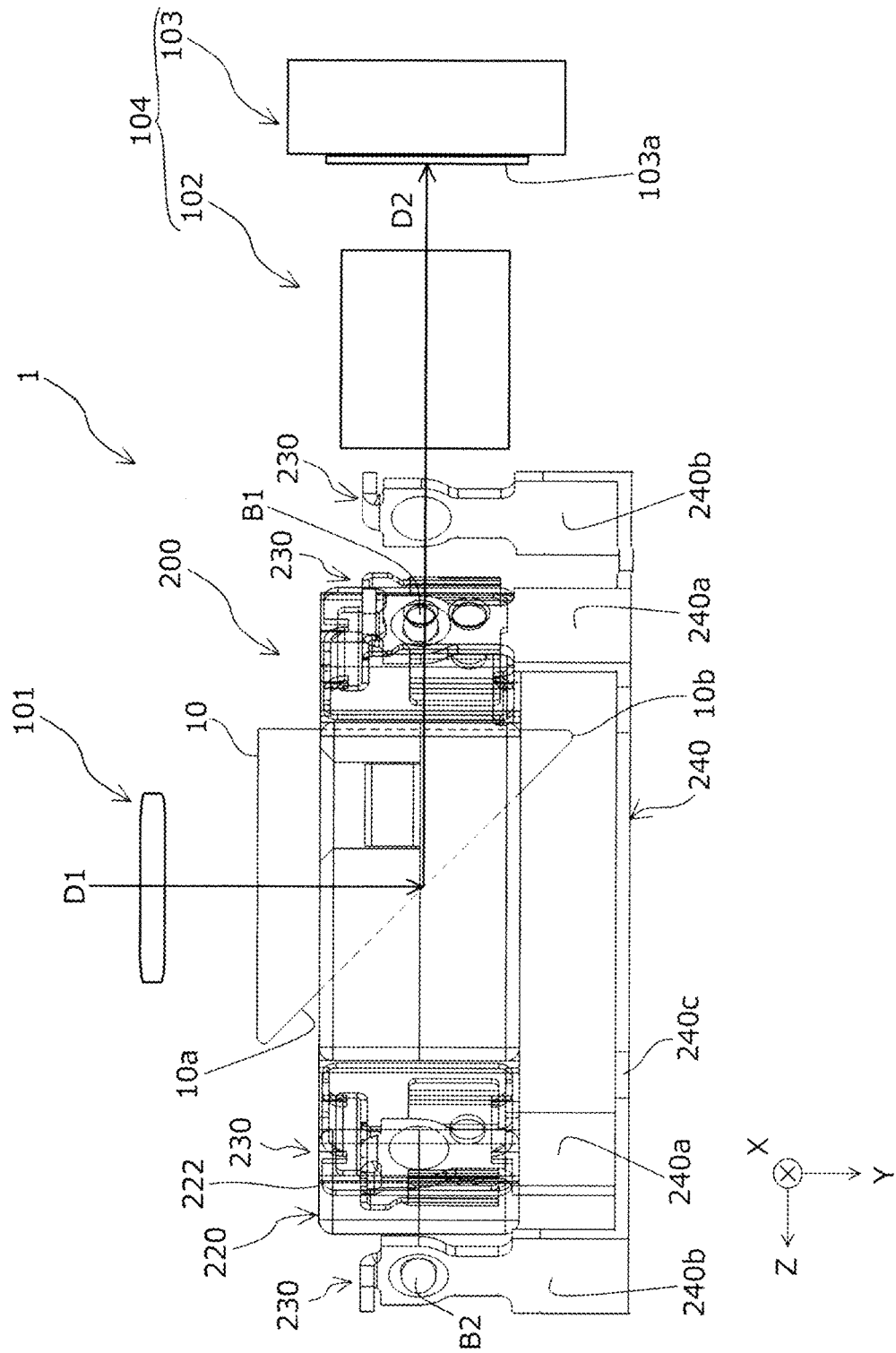
FIG. 2 is a side view of the optical unit according to the first embodiment of the present invention.

FIG. 2 is a side view of the optical unit 1 of the present embodiment. As illustrated in FIG. 2, the optical unit 1 of the present embodiment includes: a reflection unit 200 including a prism 10 which serves as a reflection portion; and a camera 104 including a circuit board 103, on which an imaging element 103a is provided, and a lens 102. The reflection unit 200 allows a light flux to be incident from the outside in the incident direction D1 via the lens 101, and reflects the incident light flux in a reflection direction D2, which is a direction toward the imaging element 103a, by a reflection surface 10a of the prism 10. Although the reflection unit 200 of the present embodiment includes the prism 10 as the reflection portion, the configuration of the reflection portion is not limited to the prism 10. That is, the reflection unit 200 may, for example, employ a configuration including a mirror as the reflection portion.

Configuration of Reflection Unit

Figure 3:
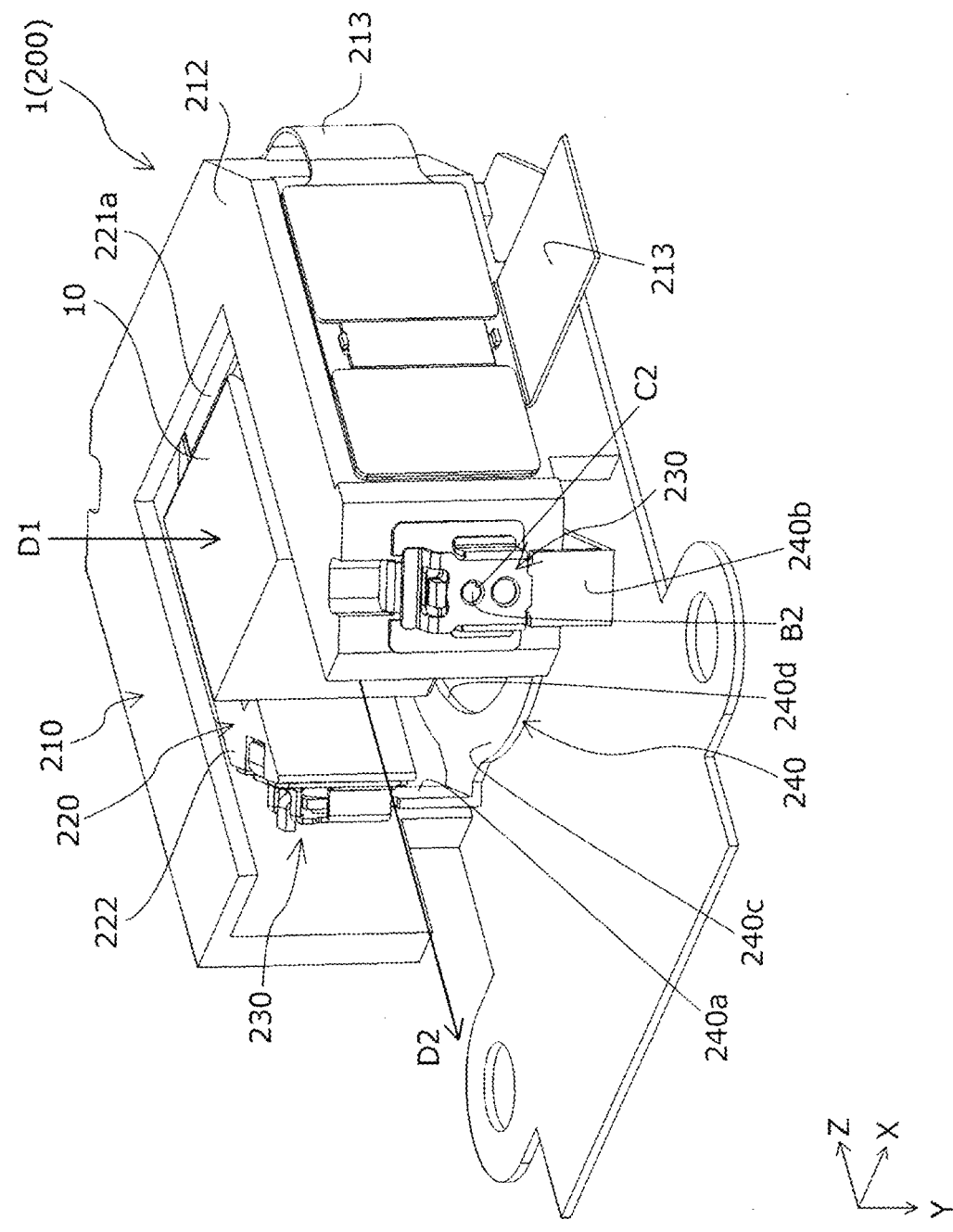
FIG. 3 is a perspective view of the optical unit according to the first embodiment of the present invention.
Figure 4:
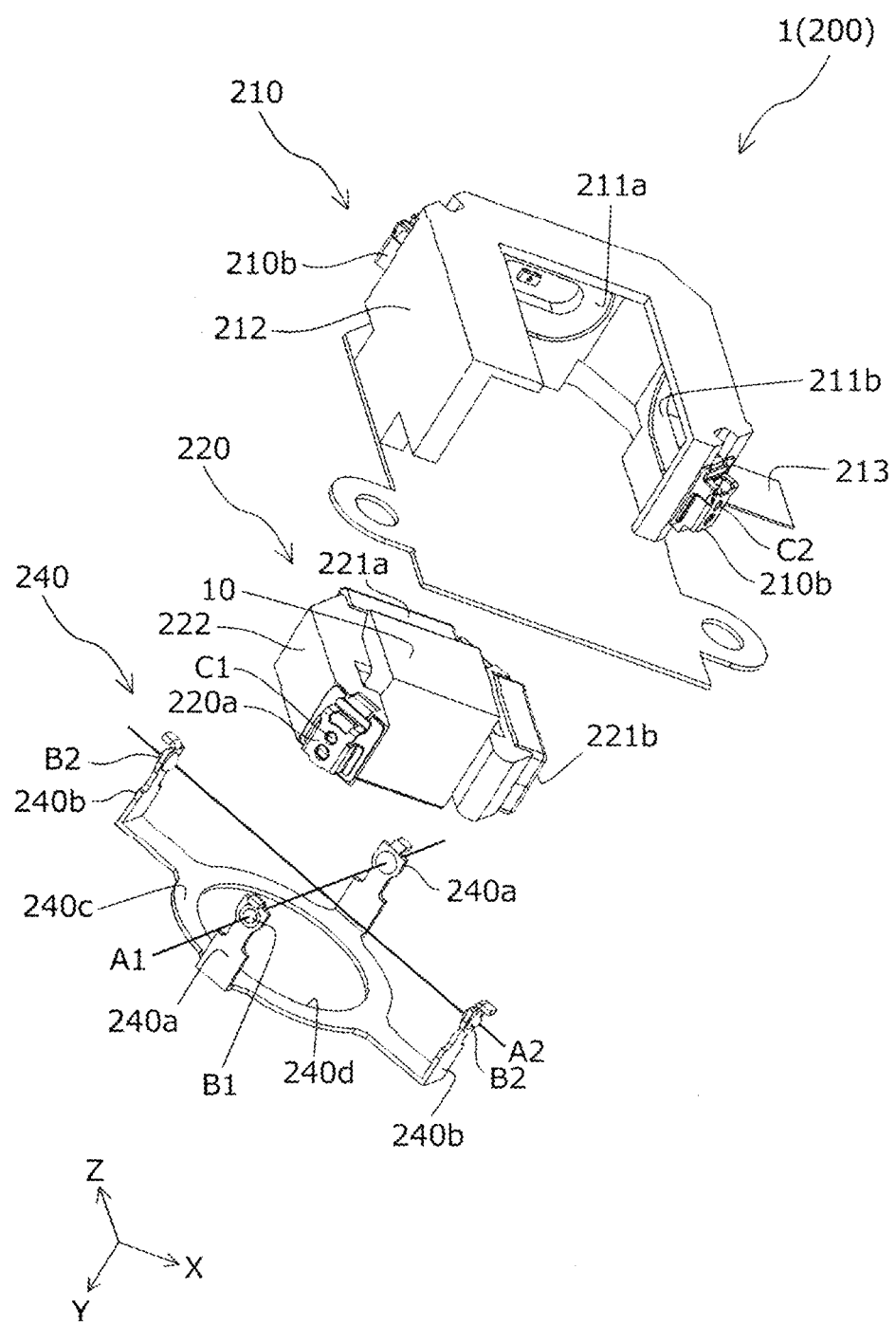
FIG. 4 is an exploded perspective view of the optical unit according to the first embodiment of the present invention.

FIG. 3 is a perspective view of the reflection unit 200 of the optical unit 1 of the present embodiment. FIG. 4 is an exploded perspective view of the reflection unit 200 of the optical unit 1 of the present embodiment. As illustrated in FIGS. 3 and 4, the reflection unit 200 includes a fixed body 210, a movable body 220 provided with the prism 10, and a gimbal mechanism 240. In FIG. 2, the fixed body 210 is not illustrated so that an internal configuration of the reflection unit 200 is easily seen.

Regarding Gimbal Mechanism

As the configuration of the reflection unit 200, first, a configuration of the gimbal mechanism 240 will be described. The "gimbal mechanism" in the present specification refers to a configuration which can be swung (rotated) about an axis at an engagement part (a holding mechanism 230 in the present embodiment) where engagement is established with objects to be engaged (the fixed body 210 and the movable body 220 in the present embodiment). For this reason, a "plate spring", which assumes itself to be fixed and distorted at the engagement part where the engagement is established with the object to be engaged, does not correspond to the "gimbal mechanism" of at least an embodiment of the present invention.

As illustrated in FIG. 4, the gimbal mechanism 240 includes a first support portion 240a which supports the movable body 220 swingably about a first axis A1, and includes a second support portion 240b which is swingably supported by the fixed body 210 about a second axis A2 intersecting the first axis A1 direction. The movable body 220 is provided with an engagement portion 220a which is engaged with the first support portion 240a, and the fixed body 210 is provided with an engagement portion 210b which is engaged with the second support portion 240b. The first support portion 240a, the engagement portion 220a, the second support portion 240b, and the engagement portion 210b constitute the holding mechanism 230 which holds the movable body 220 swingably with respect to the fixed body 210. More specifically, the two first support portions 240a are each provided with a spherical projected part B1 which is projected outwardly, and the corresponding engagement portions 220a are each provided with a circular hole part C1 which receives respective one of the projected parts B1. Similarly, the two second support portions 240b are each provided with a spherical projected part B2 which is projected outwardly, and the corresponding engagement portions 210b are each provided with a circular hole part C2 which receives respective one of the projected parts B2.

By employing a configuration including the holding mechanism 230 which is configured to include the spherical member and the receiving member receiving the spherical member as described above, sliding friction can be reduced, and the movable body 220 can be swung relative to the fixed body 210 at low power consumption. Note that, as the receiving member which receives the spherical member, a recessed part which is recessed spherically may be employed, for example, instead of the circular hole part.

As described above, the optical unit 1 of the present embodiment includes the gimbal mechanism 240 including: the first support portion 240a which supports the movable body 220 swingably about the first axis A1; and the second support portion 240b which is swingably supported by the fixed body 210 about the second axis A2. By providing such a two-axis gimbal mechanism 240, the movable body 220 provided with the reflection portion such as the prism 10 can be greatly displaced relative to the fixed body 210. Also, by employing the configuration including the gimbal mechanism 240, the movable body 220 can be held in a floating state relative to the fixed body 210, and thus the optical unit 1 of the present embodiment is resistant to impact. Furthermore, by providing the two-axis gimbal mechanism 240, compared to a configuration in which the movable body 220 is supported by a single axis relative to the fixed body 210, it is possible to prevent the movable body 220 from shifting from a desired position relative to the fixed body 210 due to an effect of gravity.

In the optical unit 1 of the present embodiment, by employing the configuration of the gimbal mechanism 240 as described above, the movable body 220 can be swung with reference to a rolling axis (Z-axis) along the reflection direction D2 (the −Z direction), and the movable body 220 can also be swung with reference to a pitching axis (X-axis) which intersects the rolling axis. By employing such a configuration, the movable body 220 can be greatly displaced relative to the fixed body 210 with the rolling axis and the pitching axis being swing axes. Note that the gimbal mechanism 240 of the optical unit 1 of the present embodiment is configured to have the two orthogonal swing axes of the first axis A1 and the second axis A2, have a drive mechanism which includes a magnet and a coil on the +X direction side and the +Z direction side of the movable body 220, and is thereby swung in the rolling axis direction (Z-axis direction) and the pitching axis direction (X-axis direction) that are shifted by 45° from the first axis A1 and the second axis A2 in a plan view. However, the configuration of the gimbal mechanism 240 is not limited to such a configuration. That is, the gimbal mechanism 240 may be configured that the first axis A1 and the second axis A2 match the rolling axis direction (Z-axis direction) or the pitching axis direction (X-axis direction).

Also, in the optical unit 1 of the present embodiment, the gimbal mechanism 240 includes a plate-shaped frame portion 240c which is provided with the first support portions 240a and the second support portion 240b and is parallel to an X-axis, Z-axis plane. Here, the frame portion 240c is arranged to be located on a leading side (+Y direction side) in the incident direction D1 relative to the movable body 220. By employing such a configuration, it becomes easy to adjust the arrangement of the arm-shaped first support portions 240a and the arm-shaped second support portion 240b with respect to the frame portion 240c, and an effect of manufacturing tolerance of the gimbal mechanism 240 can thereby be easily reduced.

Regarding Drive Mechanism of Movable Body

As the configuration of the reflection unit 200, a drive mechanism of the movable body 220 will be described next. As illustrated in FIG. 4, the movable body 220 includes, in addition to the prism 10 and the engagement portion 220a, magnets 221a, 221b on a holder frame 222. The magnet 221a is provided on the +Z direction side from the prism 10, and the magnet 221b is provided on the +X direction side from the prism 10.

Meanwhile, the fixed body 210 includes, in addition to the engagement portion 210b, coils 211a, 211b, which are electrically connected to a flexible flat cable (FFC) 213, on a fixed frame 212. The coil 211a is provided at a position opposing the magnet 221a, and the coil 211b is provided at a position opposing the magnet 221b. In the present embodiment, the coils 211a, 211b are each configured as a wound coil as an example. However, alternatively, a pattern circuit board (coil circuit board) in which a coil is incorporated into circuit board wiring as a pattern may be employed. In the optical unit 1 of the present embodiment, the position of the movable body 220 can be changed relative to the fixed body 210 by applying a current to the coils 211a, 211b. Furthermore, the magnets 221a, 221b, the coils 211a, 211b, and the holding mechanism 230 constitute a movable mechanism which allows the movable body 220 to move relative to the fixed body 210.

Figure 5:
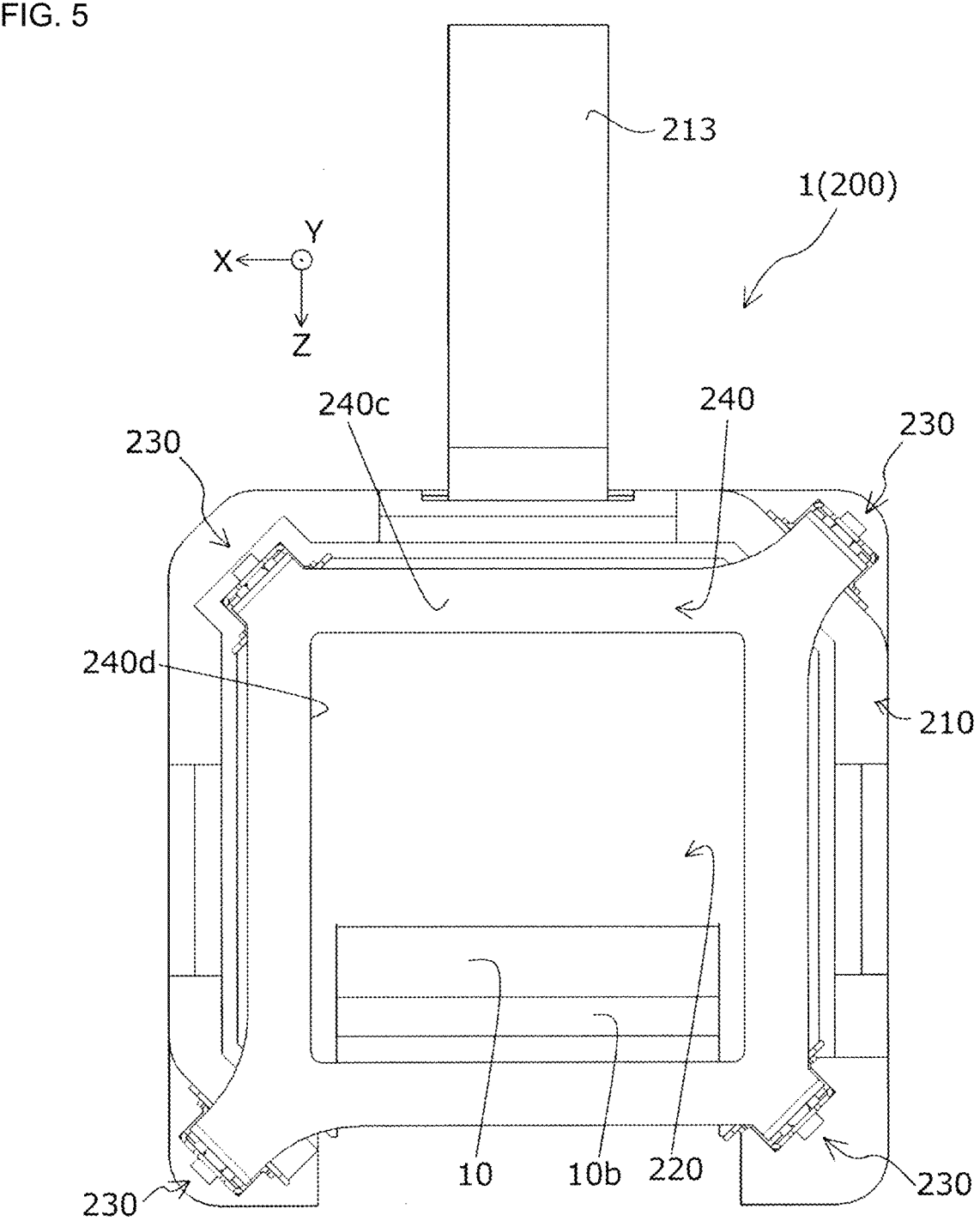
FIG. 5 is a bottom view of an optical unit according to a second embodiment of the present invention.
Figure 6:
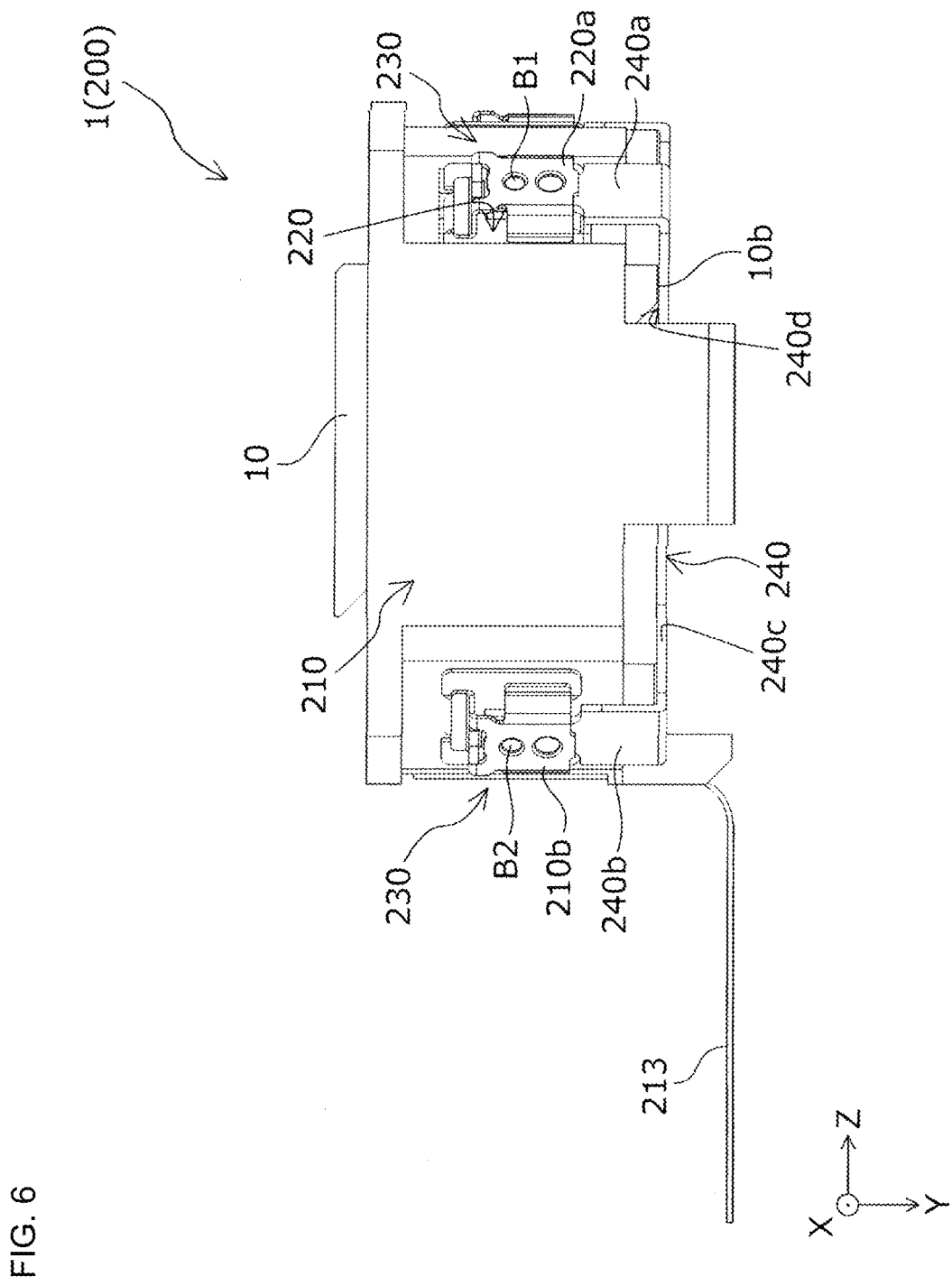
FIG. 6 is a side view of the optical unit according to the second embodiment of the present invention.

Second Embodiment (FIGS. 5 and 6)

Next, the optical unit 1 according to a second embodiment will be described with reference to FIGS. 5 and 6. FIG. 5 is a bottom view of the reflection unit 200 of the optical unit 1 according to the second embodiment of the present invention. FIG. 6 is a side view of the reflection unit 200 of the optical unit 1 according to the second embodiment of the present invention. It is noted that constitution members common to the first embodiment are denoted by the same reference numerals, and detailed description thereof will be omitted. The optical unit 1 of the present embodiment has the same configuration as the optical unit 1 of the first embodiment except for the configuration of the reflection unit 200. Further in detail, the optical unit 1 of the present embodiment has the same configuration as the optical unit 1 of the first embodiment except for the shape of the gimbal mechanism 240 and the arrangement of the gimbal mechanism 240 in the Y-axis direction.

In the optical unit 1 of the first embodiment, as illustrated in FIGS. 3 and 4, an aperture 240d provided in the frame portion 240c of the gimbal mechanism 240 is circular. Also, by employing such a configuration, in the case where the movable body 220 is swung relative to the fixed body 210, and a distance in the Y-axis direction between the movable body 220 and the frame portion 240c is extremely short, a +Y direction-side end portion 10b (see FIG. 2) of the prism 10 may contact the frame portion 240c.

Meanwhile, in the optical unit 1 of the present embodiment, as illustrated in FIG. 5, the aperture 240d, which is provided in the frame portion 240c of the gimbal mechanism 240, is rectangular, and the prism 10 is sized to fit into the aperture 240d. In other words, in the optical unit 1 of the present embodiment, the frame portion 240c is configured to be provided with the aperture 240d which prevents contact between the movable body 220 and the frame portion 240c when the movable body 220 is swung. By employing such a configuration, in the optical unit 1 of the present embodiment, as illustrated in FIG. 6, the gimbal mechanism 240 is arranged close to the movable body 220 while contact between the movable body 220 and the frame portion 240c at the time when the movable body 220 is swung is prevented. In this way, the optical unit 1 is downsized.

Figure 7:
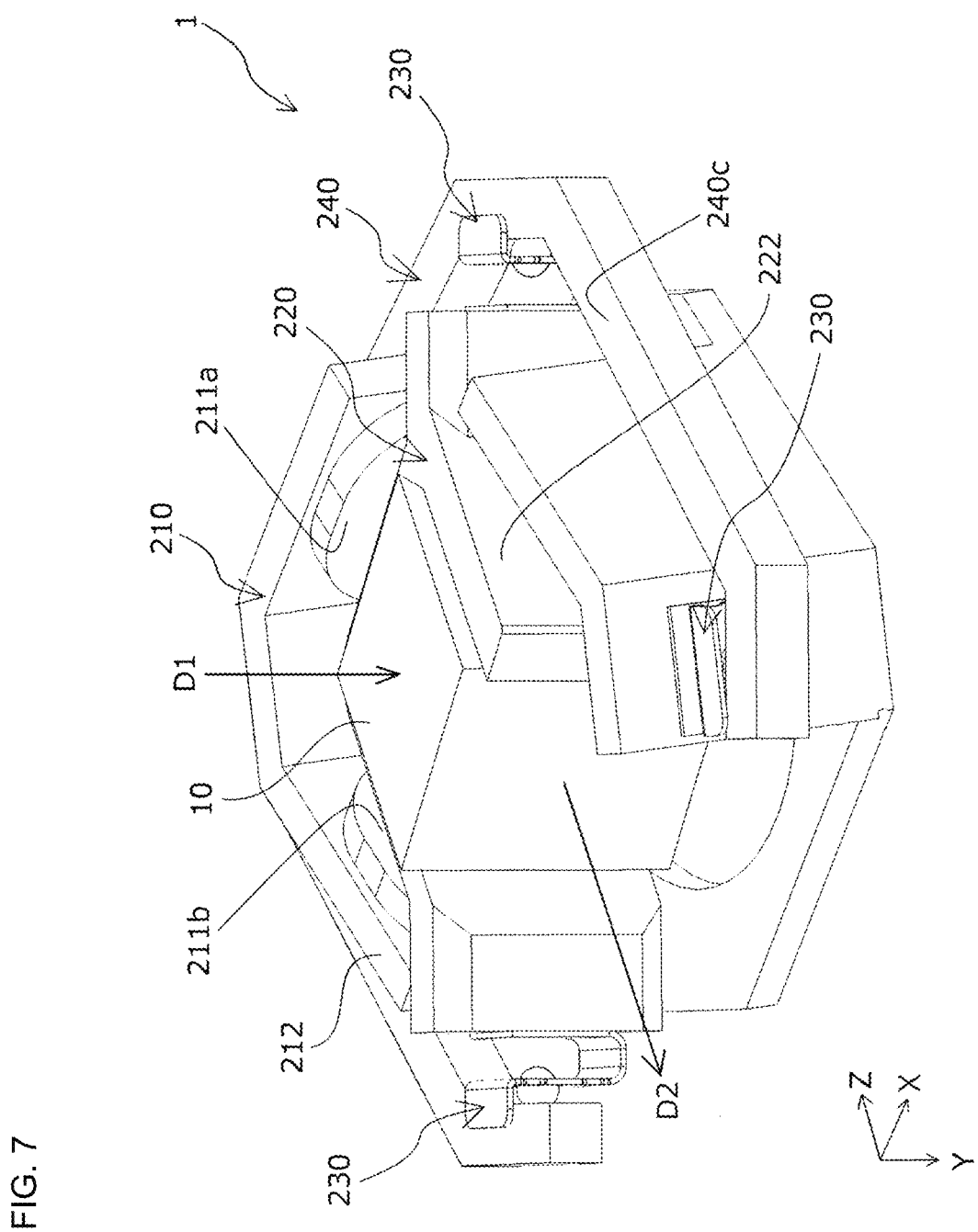
FIG. 7 is a perspective view of an optical unit according to a third embodiment of the present invention.
Figure 8:
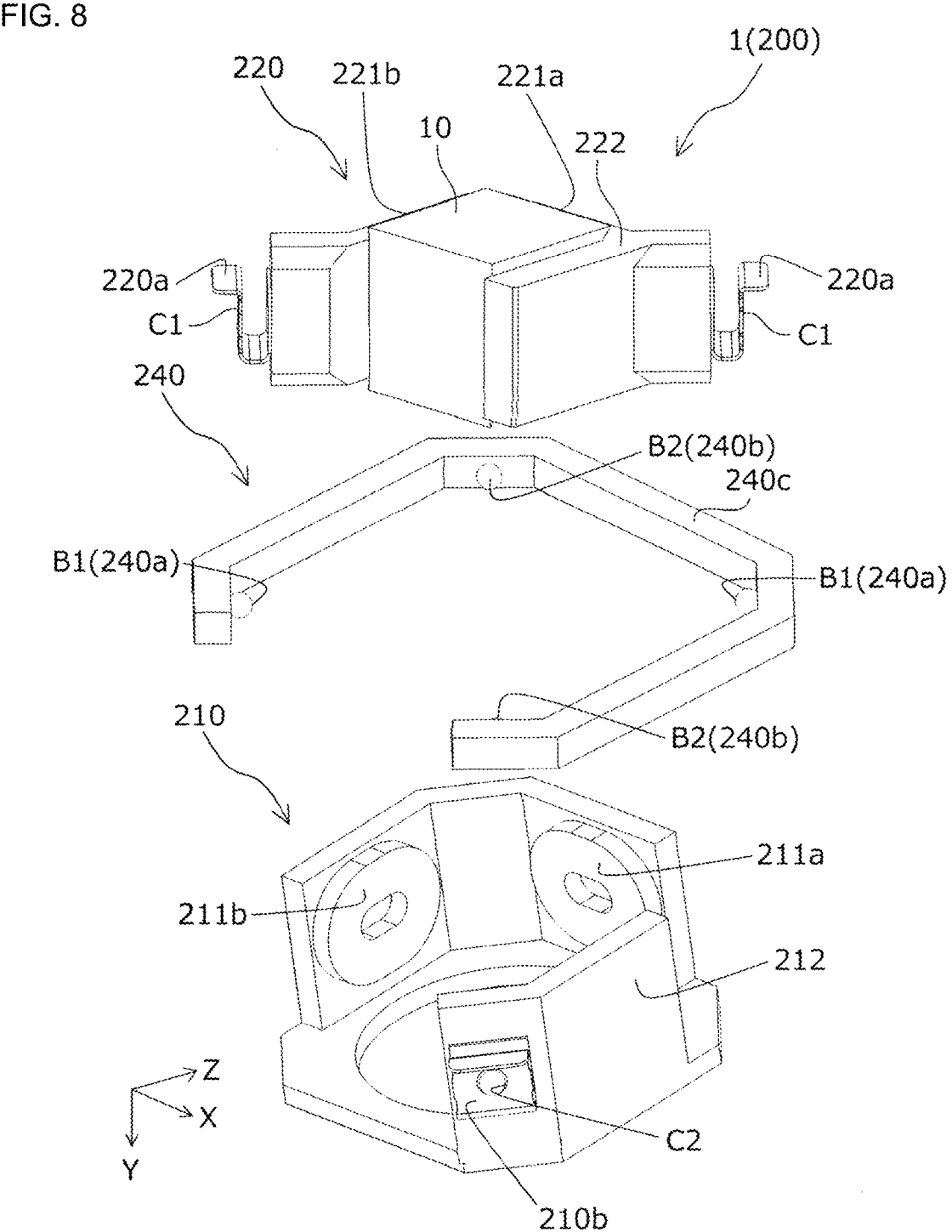
FIG. 8 is an exploded perspective view of the optical unit according to the third embodiment of the present invention.
Figure 9:
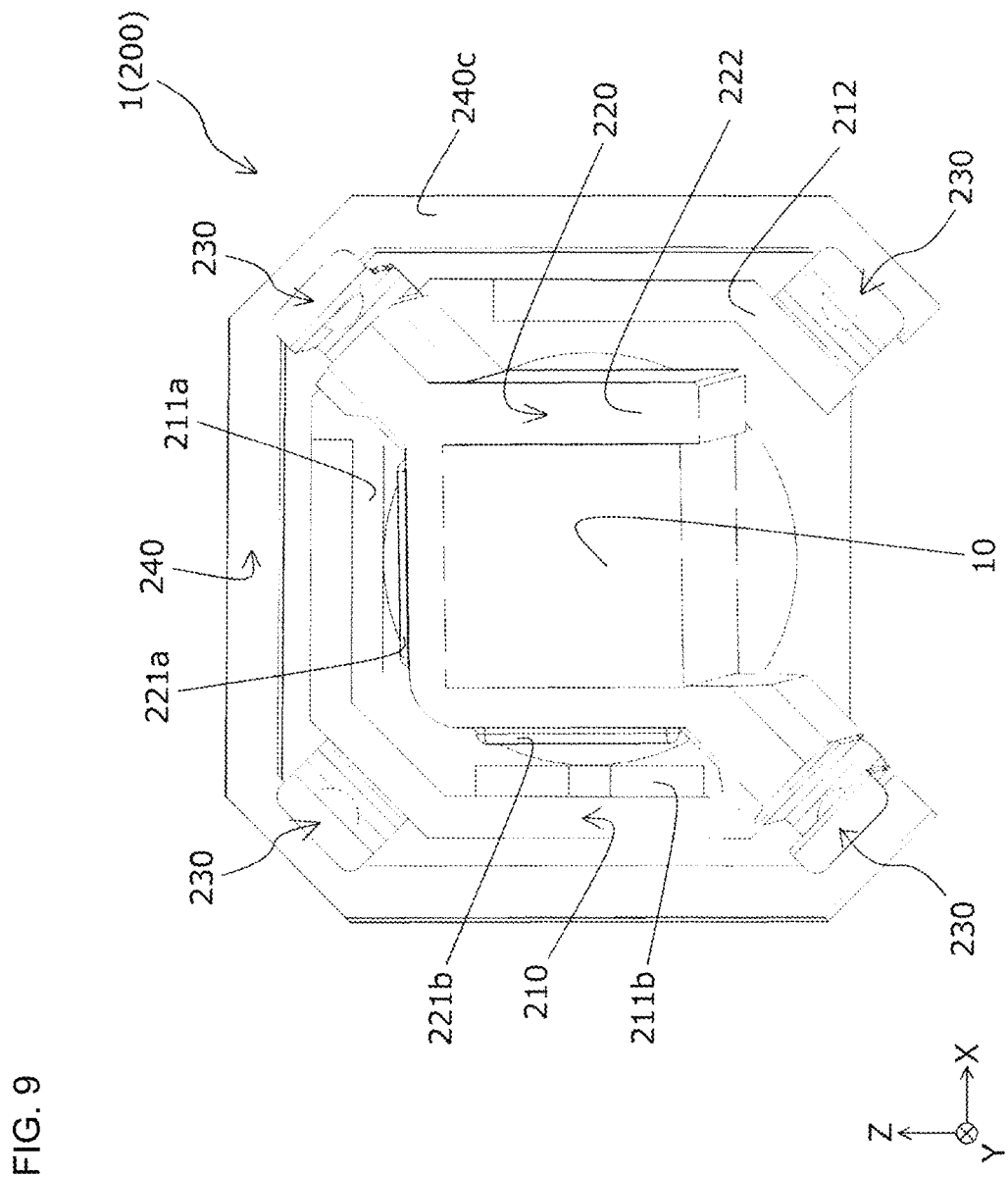
FIG. 9 is a plan view of the optical unit according to the third embodiment of the present invention.

Third Embodiment (FIGS. 7 to 9)

Next, the optical unit 1 according to a third embodiment will be described with reference to FIGS. 7 to 9. FIG. 7 is a perspective view of the reflection unit 200 of the optical unit 1 according to the third embodiment of the present invention. FIG. 8 is an exploded perspective view of the reflection unit 200 of the optical unit 1 according to the third embodiment of the present invention. FIG. 9 is a plan view of the reflection unit 200 of the optical unit 1 according to the third embodiment of the present invention. It is noted that constitution members common to the first and second embodiments are denoted by the same reference numerals, and detailed description thereof will be omitted. The optical unit 1 of the present embodiment has the same configuration as the optical units 1 of the first and second embodiments except for the configuration of the reflection unit 200.

In the optical units 1 of the first and second embodiments, the frame portion 240c of the gimbal mechanism 240 is configured to be located on the +Y direction side from the movable body 220. Meanwhile, as illustrated in FIG. 7, the optical unit 1 of the present embodiment is configured that the frame portion 240c of the gimbal mechanism 240 is arranged at a position which overlaps the movable body 220 in the Y-axis direction.

As described from a different perspective, in the optical unit 1 of the present embodiment, as illustrated in FIG. 8, the gimbal mechanism 240 includes the frame portion 240c which is provided with the first support portion 240a and the second support portion 240b. Also, as illustrated in FIGS. 7 and 9, the frame portion 240c is arranged to be located around the movable body 220 when seen in the incident direction D1 (that is, in a plan view). By employing such a configuration, it is possible to avoid a configuration in which the frame portion 240c of the gimbal mechanism 240 is located on the +Y direction side or the −Y direction side from the movable body 220, and the optical unit 1 can be formed thinly in the incident direction D1 (Y-axis direction).

As illustrated in FIGS. 7 to 9, in the reflection unit 200 of the present embodiment, in the plan view, the fixed body 210 is arranged around the movable body 220, and the gimbal mechanism 240 is arranged around the fixed body 210. As illustrated in FIG. 8, in the gimbal mechanism 240, the projected part B1 as the first support portion 240a and the projected part B2 as the second support portion 240b are provided in the frame portion 240c, the hole part C1 which is fitted to the projected part B1 is provided in the movable body 220, and the hole part C2 which is fitted to the projected part B2 is provided in the fixed body 210.

Figure 10:
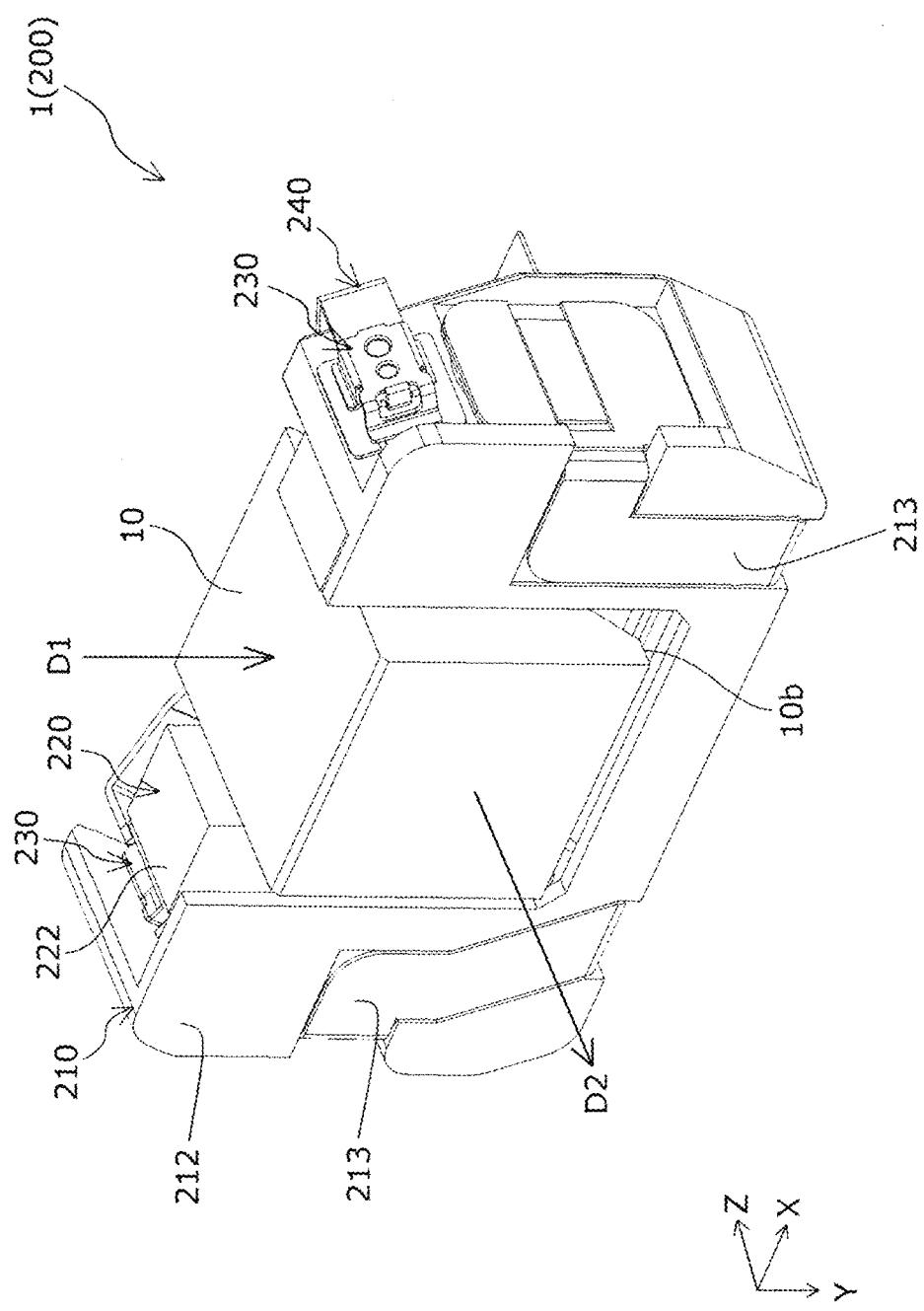
FIG. 10 is a perspective view of an optical unit according to a fourth embodiment of the present invention.
Figure 11:
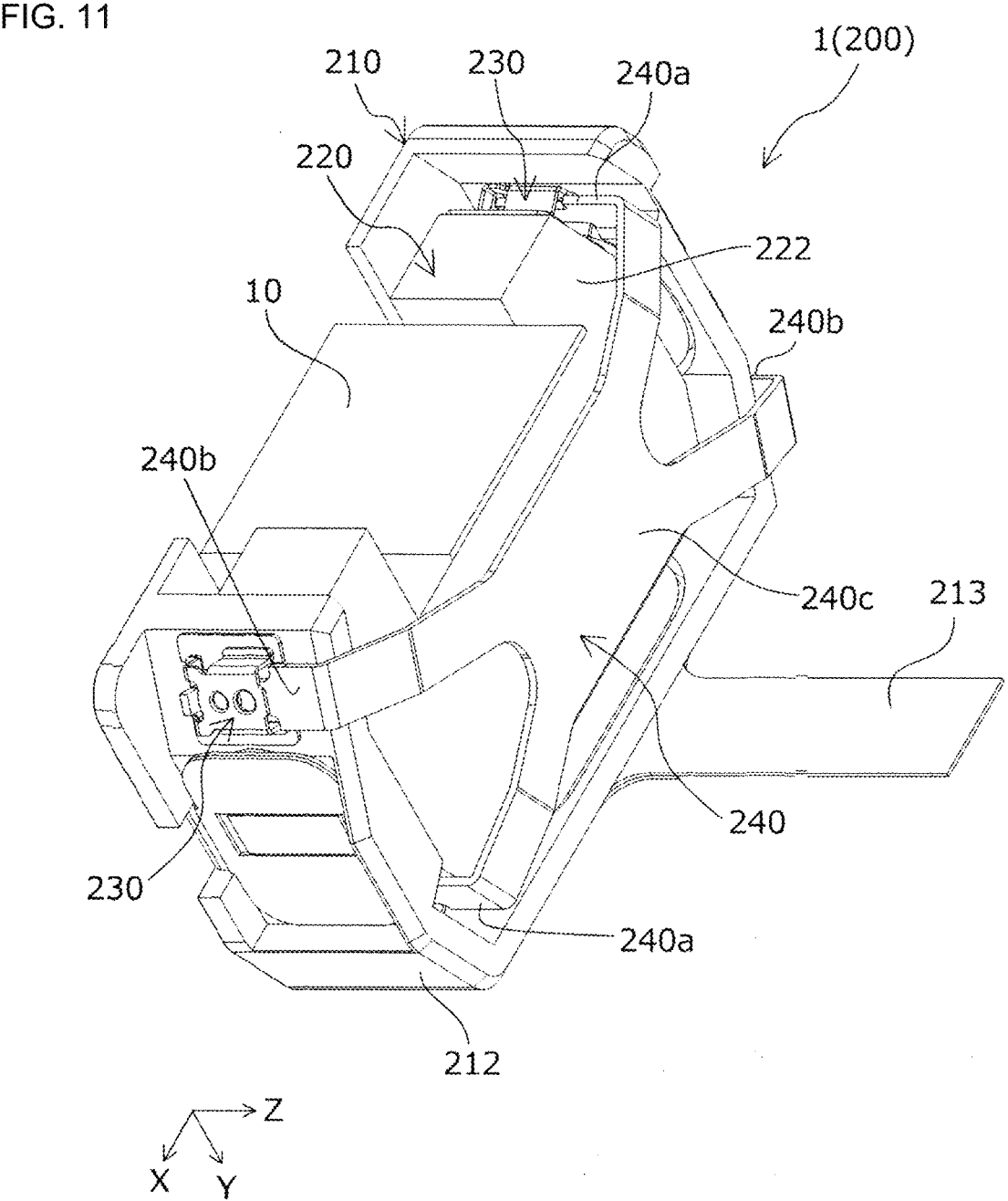
FIG. 11 is a perspective view of the optical unit according to the fourth embodiment of the present invention and is a view which is seen in a different direction from that in FIG. 10.
Figure 12:
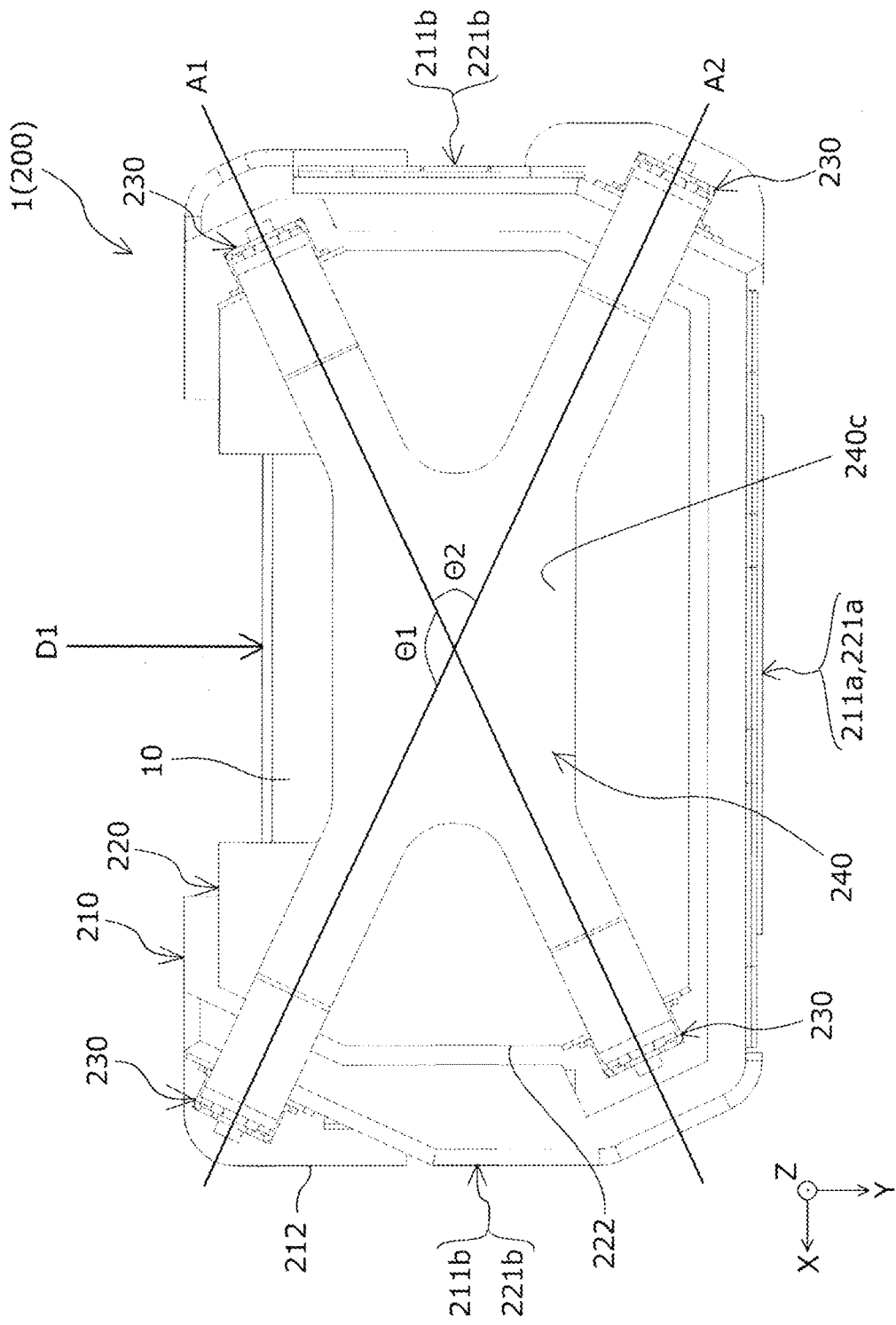
FIG. 12 is a back view of the optical unit according to the fourth embodiment of the present invention.

Fourth Embodiment (FIGS. 10 to 12)

Next, the optical unit 1 according to a fourth embodiment will be described with reference to FIGS. 10 to 12. FIGS. 10 and 11 are perspective views of the reflection unit 200 of the optical unit 1 according to the fourth embodiment of the present invention and are views which are seen in different directions from each other. FIG. 10 is a back view of the reflection unit 200 of the optical unit 1 according to the fourth embodiment of the present invention. It is noted that constitution members common to the first to third embodiments are denoted by the same reference numerals, and detailed description thereof will be omitted. The optical unit 1 of the present embodiment has the same configuration as the optical units 1 of the first to third embodiments except for the configuration of the reflection unit 200.

As described above, the optical units 1 of the first to third embodiments are each configured to include the gimbal mechanism 240 in which the plate-shaped frame portion 240c is parallel to the X-axis, Z-axis plane and has the pitching axis and the rolling axis as the swing axes. Meanwhile, as illustrated in FIGS. 10 to 12, the optical unit 1 of the present embodiment is configured to include the gimbal mechanism 240 in which the plate-shaped frame portion 240c is parallel to an X-axis, Y-axis plane and has the pitching axis and a yawing axis as the swing axes.

In other words, in the optical unit 1 of the present embodiment, the gimbal mechanism 240 is arranged such that the movable body 220 can be swung with reference to the pitching axis (X-axis) which intersects the rolling axis (Z-axis) along the reflection direction D2 (−Z direction) and that the movable body 220 can be swung with reference to the yawing axis (Y-axis) which intersects the rolling axis and also intersects the pitching axis. By employing such a configuration, the movable body 220 can be greatly displaced relative to the fixed body 210 with the pitching axis and the yawing axis being the swing axes.

In the optical units 1 of the first to third embodiments, in the gimbal mechanism 240, the first axis A1, along which gimbal mechanism 240 holds the movable body 220, is orthogonal to the second axis A2, along which the gimbal mechanism 240 is held by the fixed body 210. On the contrary, as illustrated in FIGS. 11 and 12, in the optical unit 1 of the present embodiment, the first axis A1 and the second axis A2 are not orthogonal to each other. More specifically, as illustrated in FIG. 12, the first axis A1 and the second axis A2 intersect in such arrangement that, when seen in the reflection direction D2 (in a back view), an intersection angle θ1 on the incident direction D1 side is larger than an intersection angle θ2 on an intersection direction side intersecting the incident direction D1. In the optical unit 1 of the present embodiment, by employing such a configuration, the optical unit 1 is formed thinly in the incident direction D1. In the present embodiment, the intersection angle θ1 is set to 150°, and the intersection angle θ2 is set to 30°. However, there is no particular limitation on the angular values of the intersection angle θ1 and the intersection angle θ2.

Also, similar to the optical units 1 of the first to third embodiments, in the optical unit 1 of the present embodiment, the movable mechanism which allows the movable body 220 to move relative to the fixed body 210 includes: the magnets 221a, 221b provided on the movable body 220; and the coils 211a, 211b provided at positions, which oppose the magnets 221a, 221b, on the fixed body 210. By employing such a configuration, the movable mechanism can be formed easily, and the configuration prevents the FFC 213, which serves as a cable connected to the coils 211a, 211b, for example, from obstructing mobility of the movable body 220.

Here, in the optical units 1 of the first to third embodiments, the movable mechanism includes: the single first magnet 221a provided behind the movable body 220 in the reflection direction D2 with respect to the prism 10; and the single second magnet 221b which is sized equivalent to the first magnet 221a and provided on one of the intersection direction sides of the movable body 220 with respect to the prism 10. Meanwhile, as illustrated in FIG. 12, in the optical unit 1 of the present embodiment, the movable mechanism includes: the single first magnet 221a provided on the front side of the movable body 220 in the reflection direction D2 with respect to the prism 10; and a total of the two second magnets 221b, each of which is smaller than the first magnet 221a and which are provided on both of the intersection direction sides of the movable body 220 with respect to the prism 10. A reason for making each of the second magnets 221b smaller than the first magnet 221a is because of a small space where the second magnet 221b can be arranged. Note that the fixed body 210 includes the single coil 211a corresponding to the single first magnet 221a, and the two coils 211b corresponding to the two second magnets 221b. Downsizing of the single magnet possibly lowers the performance of the movable mechanism. However, since the optical unit 1 of the present embodiment employs the configuration of including the two second magnets 221b, such a configuration prevents the performance of the movable mechanism from being lowered due to the optical unit 1 being formed thinly in the incident direction D1.

Figure 13:
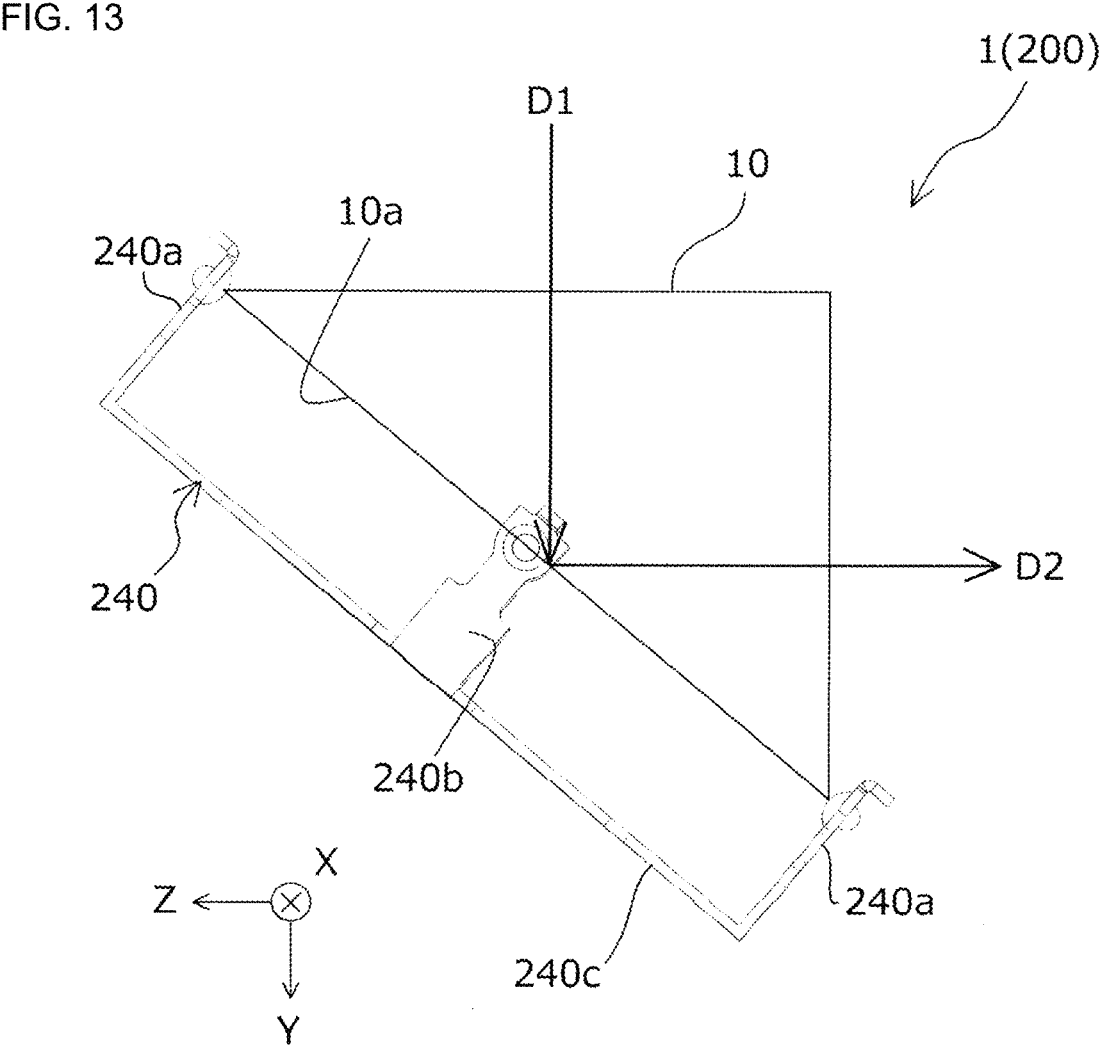
FIG. 13 is a side view of an optical unit according to a fifth embodiment of the present invention.

Fifth Embodiment (FIG. 13)

Next, the optical unit 1 according to a fifth embodiment will be described with reference to FIG. 13. FIG. 13 is a schematic side view of the reflection unit 200 of the optical unit 1 according to the fifth embodiment of the present invention, and is a view illustrating a positional relationship between the gimbal mechanism 240 and the prism 10. It is noted that constitution members common to the first to fourth embodiments are denoted by the same reference numerals, and detailed description thereof will be omitted. The optical unit 1 of the present embodiment has the same configuration as the optical units 1 of the first to fourth embodiments except for the configuration of the reflection unit 200.

As described above, in the optical units 1 of the first to fourth embodiments, the rolling axis is in the direction along the Z-axis, the pitching axis is in the direction along the X-axis, and the yawing axis is in the direction along the Y-axis. In the optical unit 1 of the present embodiment, similar to the optical unit 1 of the fourth embodiment, the gimbal mechanism 240 allows the movable body 220 to be swung with reference to axes in two directions that intersect the rolling axis. That is, the gimbal mechanism 240 of the present embodiment is arranged such that the movable body 220 can be swung with reference to the pitching axis and that the movable body 220 can be swung with reference to the yawing axis. However, in the optical unit 1 of the present embodiment, the gimbal mechanism 240 has the pitching axis shifted from the X-axis and the yawing axis shifted from the Y-axis.

As described from a different perspective, in the optical unit 1 of the present embodiment, the gimbal mechanism 240 is arranged in a direction in which the pitching axis and the yawing axis are along the reflection surface 10a of the prism 10. By employing such a configuration of the optical unit 1 of the present embodiment, the optical unit 1 can be formed thinly in a direction that intersects the reflection surface 10a. Here, the "direction along the reflection surface 10a" is not limited to the direction along the reflection surface 10a in the strict sense, but means that the direction should be substantially along the reflection surface 10a.

The present invention is not limited to the above-described embodiments, and can be realized with various configurations without departing from the spirit of the present invention. For example, the technical features in the embodiments corresponding to the technical features in each of the aspects described in SUMMARY may be appropriately replaced or combined to solve some or all of the problems described above, or to achieve some or all of the effects described above. Further, unless the technical features are described as essential in the present specification, it may be omitted as appropriate.

What is claimed is:

1. An optical unit comprising:
   a reflection unit; and
   a camera comprising a circuit board, on which an imaging element is provided, and a lens;
   wherein the reflection unit comprises:
   a reflection portion which reflects an incident light flux from an incident direction on outside in a reflection direction toward the imaging element;
   a movable body comprising the reflection portion;
   a fixed body;
   a movable mechanism which allows the movable body to move relative to the fixed body; and
   a gimbal mechanism comprising a first support portion which supports the movable body swingably about a first axis, and comprising a second support portion which is swingably supported by the fixed body about a second axis intersecting the first axis direction;
   each of the first support portion and the second support portion defines a holding mechanism having a spherical member and a receiving member receiving the spherical member; and
   the movable body is swingably supported by the fixed body through the holding mechanism.

2. The optical unit according to claim 1, wherein the gimbal mechanism is arranged such that the movable body can be swung with reference to a rolling axis along the reflection direction and that the movable body can be swung with reference to a pitching axis which intersects the rolling axis.

3. The optical unit according to claim 2, wherein
the gimbal mechanism comprises a frame portion which is provided with the first support portion and the second support portion, and
the frame portion is arranged to be located on a leading side in the incident direction relative to the movable body.

4. The optical unit according to claim 3, wherein
the frame portion is provided with an aperture which prevents contact between the movable body and the frame portion when the movable body is swung.

5. The optical unit according to claim 2, wherein
the gimbal mechanism comprises a frame portion which is provided with the first support portion and the second support portion, and
the frame portion is arranged to be located around the movable body when seen in the incident direction.

6. The optical unit according to claim 1, wherein
the movable mechanism comprises: a magnet provided on the movable body; and a coil provided at a position, which opposes the magnet, on the fixed body.

7. An optical unit comprising:
a reflection portion which reflects an incident light flux from an incident direction on outside in a reflection direction toward an imaging element;
a movable body comprising the reflection portion;
a fixed body;
a movable mechanism which allows the movable body to move relative to the fixed body; and
a gimbal mechanism comprising a first support portion which supports the movable body swingably about a first axis, and comprising a second support portion which is swingably supported by the fixed body about a second axis intersecting the first axis direction, wherein
the gimbal mechanism is arranged such that the movable body can be swung with reference to a pitching axis which intersects a rolling axis along the reflection direction and that the movable body can be swung with reference to a yawing axis which intersects the rolling axis and also intersects the pitching axis.

8. The optical unit according to claim 7, wherein
the gimbal mechanism is arranged in a direction in which at least one of the pitching axis and the yawing axis is along a reflection surface of the reflection portion.

9. The optical unit according to claim 8, wherein
the first axis and the second axis intersect in such arrangement that, when seen in the reflection direction, an intersection angle on the incident direction side is larger than an intersection angle on an intersection direction side intersecting the incident direction.

10. The optical unit according to claim 9, wherein
the movable mechanism comprises: a magnet provided on the movable body; and a coil provided at a position, which opposes the magnet, on the fixed body.

11. The optical unit according to claim 10, wherein
the movable mechanism comprises, as the magnets: a first magnet provided on a front side of the movable body in the incident direction with respect to the reflection portion; and a second magnet which is smaller than the first magnet and is provided on each of the intersection direction sides of the movable body with respect to the reflection portion.

12. The optical unit according to claim 7, wherein
the first axis and the second axis intersect in such arrangement that, when seen in the reflection direction, an intersection angle on the incident direction side is larger than an intersection angle on an intersection direction side intersecting the incident direction.

13. The optical unit according to claim 12, wherein
the movable mechanism comprises: a magnet provided on the movable body; and a coil provided at a position, which opposes the magnet, on the fixed body.

14. The optical unit according to claim 13, wherein
the movable mechanism comprises, as the magnets: a first magnet provided on a front side of the movable body in the incident direction with respect to the reflection portion; and a second magnet which is smaller than the first magnet and is provided on each of the intersection direction sides of the movable body with respect to the reflection portion.

* * * * *